US008955588B2

(12) United States Patent  
Ogle et al.

(10) Patent No.: US 8,955,588 B2  
(45) Date of Patent: Feb. 17, 2015

(54) ELECTRON-POOR ORTHOESTER FOR GENERATING ACID IN A WELL FLUID

(75) Inventors: James William Ogle, Spring, TX (US); Rajesh Kumar Saini, Cypress, TX (US); Gary P. Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 204 days.

(21) Appl. No.: 13/608,602

(22) Filed: Sep. 10, 2012

(65) Prior Publication Data

US 2014/0069643 A1  Mar. 13, 2014

(51) Int. Cl.  
*E21B 43/22* (2006.01)  
*E21B 43/27* (2006.01)

(52) U.S. Cl.  
USPC .................................. 166/279; 166/305.1

(58) Field of Classification Search  
CPC .................................. E21B 43/22; E21B 43/27  
USPC ........ 166/279, 282, 305.1, 311; 507/260, 267  
See application file for complete search history.

(56) References Cited

U.S. PATENT DOCUMENTS

| | | | |
|---|---|---|---|
| 4,061,580 A | 12/1977 | Jahnke | |
| 4,215,001 A | 7/1980 | Elphingstone et al. | |
| 4,324,669 A | 4/1982 | Norman et al. | |
| 5,082,056 A | 1/1992 | Tackett, Jr. | |
| 6,063,738 A | 5/2000 | Chatterji | |
| 7,159,659 B2 | 1/2007 | Welton et al. | |
| 7,165,617 B2 | 1/2007 | Lord et al. | |
| 7,299,874 B2 | 11/2007 | Welton et al. | |
| 7,299,876 B2 | 11/2007 | Lord et al. | |
| 7,303,019 B2 | 12/2007 | Welton et al. | |
| 7,621,337 B2 | 11/2009 | Badalamenti et al. | |
| 7,727,935 B2 | 6/2010 | Welton et al. | |
| 7,921,912 B2 | 4/2011 | Saini et al. | |
| 8,012,914 B2 | 9/2011 | Welton | |
| 2005/0045328 A1 | 3/2005 | Frost et al. | |
| 2005/0197257 A1 | 9/2005 | Bouwmeester | |
| 2006/0183646 A1 | 8/2006 | Welton et al. | |
| 2007/0042912 A1 | 2/2007 | Welton et al. | |
| 2008/0035341 A1 | 2/2008 | Saini et al. | |
| 2008/0035342 A1 | 2/2008 | Saini et al. | |

(Continued)

FOREIGN PATENT DOCUMENTS

| | | |
|---|---|---|
| EP | 0278540 A2 | 8/1988 |
| GB | 2163790 A | 3/1986 |

OTHER PUBLICATIONS

Darran McDuff, Shalawn Jackson, Chris Shuchart, Dieter Postl "Understanding Wormholes in Carbonates: Unprecedented Experimental Scale and 3D Visualization," SPE 129329, Technology Today Series, Oct. 2010, pp. 78-81.

(Continued)

*Primary Examiner* — William P Neuder  
(74) *Attorney, Agent, or Firm* — Craig W. Roddy; Baker Botts L.L.P.

(57) ABSTRACT

In an embodiment, a method is provided including the steps of: (A) introducing a well fluid comprising an electron-poor orthoester into a well; and (B) allowing or causing the electron-poor orthoester to hydrolyze to produce an acid and an alcohol in the well. In another embodiment, a water-based well fluid is provided, the well fluid including: (A) a continuous aqueous phase having a pH of a least 6; (B) an electron-poor orthoester; and (C) a viscosity-increasing agent.

22 Claims, 3 Drawing Sheets

Ar=electron poor aryl    Es=esters

X = sodium salt or alkyl or aryl group    ie ketones

(56) References Cited

U.S. PATENT DOCUMENTS

| | | | |
|---|---|---|---|
| 2008/0103070 A1 | 5/2008 | Welton | |
| 2010/0096129 A1 | 4/2010 | Hinkel et al. | |
| 2010/0267591 A1 | 10/2010 | Todd et al. | |
| 2011/0172401 A1* | 7/2011 | Cujec et al. | 530/399 |
| 2011/0214862 A1* | 9/2011 | Horton et al. | 166/283 |

OTHER PUBLICATIONS

Ernesto Barragan, Fabrizio Serrano, Marco Cayo, Cristian Ramirez, Carlos Martinez, "Clean Up Acid System for Gravel-Pack Completions Without Increasing Water Production," SPE 123869, 2009 SPE Annual Technical Conference and Exhibition, New Orleans, Louisiana, Oct. 4-7, 2009, 9 pages.

Gerard Glasbergen, Nitika Kalia, Malcolm Talbot, "The Optimum Injection Rate for Wormhole Propagation: Myth or Reality?" SPE 121464, 2009 SPE European Formation Damage Conference, Scheveningen, The Netherlands, May 27-29, 2009, 16 pages.

Nitika Kalia, Gerard Glasbergen, "Wormhole Formation in Carbonates under Varying Temperature Conditions," SPE 121803, 009 SPE European Formation Damage Conference, Scheveningen, The Netherlands, May 27-29, 2009, 19 pages.

Jose A. Mora, Felix Kondo, Sandra Gonzalez Pinto, "The Challenge of Producing and Stimulating a Deep Sandstone-Carbonate Reservoir With Combined Organic and Inorganic Formation Damage," SPE 121008, 2009 SPE Western Regional Meeting, San Jose, California, 20 pages.

R. Gdanski, "Recent Advances in Carbonate Stimulation," IPTC 10693, International Petroleum Technology Conference, Doha, Qatar, Nov. 21-23, 2005, 8 pages.

Lewis R. Norman, Michael W. Conway, J. Michael Wilson, "Temperature-Stable Acid-Gelling Polymers: Laboratory Evaluation and Field Results," SPE 10260, Journal of Petroleum Technology, Nov. 1984, pp. 2011-2018.

J. Chatterji, J.K. Borchardt, "Applications of Water-Soluble Polymers in the Oil Field," SPE 9288, Journal of Petroleum Technology, Nov. 1981, pp. 2042-2056.

International Search Report, PCT/US2013/050460, Date of Mailing Oct. 21, 2013, 5 pages.

* cited by examiner

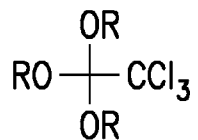 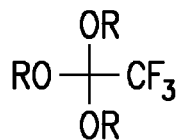 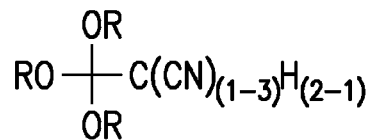
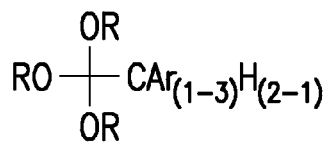 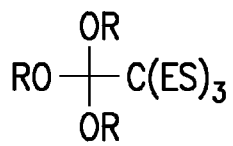 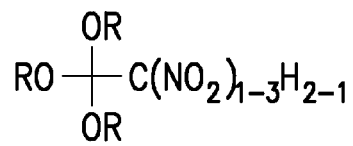
Ar=electron poor aryl   Es=esters
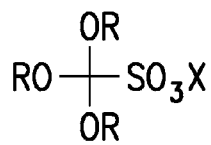 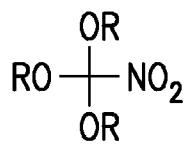 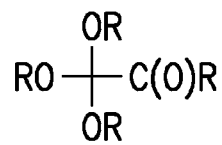
X = sodium salt or alkyl or aryl group     ie ketones
*FIG. 4*
*FIG. 5*
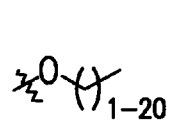 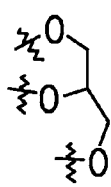 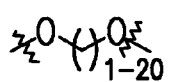
sorbitol, monosaccharides polyols    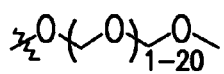    and combinations thereof

ELECTRON-POOR ORTHOESTER FOR GENERATING ACID IN A WELL FLUID

TECHNICAL FIELD

The inventions are in the field of producing crude oil or natural gas from subterranean formations. More specifically, the inventions generally relate to methods of in-situ generation of acid in a well, which can have a wide variety of applications.

BACKGROUND

To produce oil or gas, a well is drilled into a subterranean formation that is an oil or gas reservoir.

Well Servicing and Well Fluids

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control. These and other types of well treatments and treatment fluids are known in the art.

Problems with Using Acids in Well Fluids

Acids are commonly needed in well fluids for various well services.

A problem associated with using acidic well fluids is the corrosion caused by the acidic solution to any metal goods (such as tubular goods) in the well bore and the other equipment used to carry out the treatment. Acidic fluids have a tendency to corrode tubing, casing, and downhole equipment, such as gravel pack screens and downhole pumps, especially at elevated temperatures. The expense of repairing or replacing corrosion-damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. In addition, the partial neutralization of the acid with metal goods can result in the production of quantities of metal ions that are highly undesirable in the subterranean formation.

Another problem associated with acids in well fluid is that the acids or the acidic well fluids can pose handling or safety concerns due to the reactivity of the acid. For instance, during a conventional acidizing operation, corrosive fumes may be released from the acid as it is injected down the well bore. The fumes can cause an irritation hazard to nearby personnel, and a corrosive hazard to surface equipment used to carry out the operation.

Although acidizing a portion of a subterranean formation can be very beneficial in terms of increasing the permeability of the formation to fluid flow, conventional acidizing systems have significant drawbacks. One major problem associated with conventional acidizing treatment systems is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain organic acids, hydrochloric acid or a mixture of hydrofluoric and hydrochloric acids, have high acid strength and quickly react with the formation itself, fines and damage nearest the well bore, and do not penetrate the formation to a desirable degree before becoming spent. To achieve optimal results, it is desirable to maintain the acidic solution in a reactive condition for as long a period as possible to maximize the degree of penetration so that the permeability enhancement produced by the acidic solution may be increased. Alternatively, a delayed release of an acid can be useful.

Therefore, among other needs, there is a need for fluids and methods that reduce the problems of using acids.

SUMMARY OF THE INVENTION

In an embodiment, a method is provided including the steps of: (A) introducing a well fluid comprising an electron-poor orthoester into a well; and (B) allowing or causing the electron-poor orthoester to hydrolyze to produce an acid and an alcohol in the well.

In another embodiment, a water-based well fluid is provided, the well fluid including: (A) a continuous aqueous phase having a pH of a least 6; (B) an electron-poor orthoester; and (C) a viscosity-increasing agent.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

FIG. 4 presents an abbreviated listing of some of the electron-poor orthoesters that are expected to be useful according to the present invention.

FIG. 5 presents an abbreviated listing of some of the alcohol groups that are expected to be useful in the electron-poor orthoesters according to the present invention

DETAILED DESCRIPTION OF PRESENTLY PREFERRED EMBODIMENTS AND BEST MODE

Electron-Poor Orthoesters for Use in a Well Fluid or Well Treatment

The purpose of this invention is to describe a non-oxidizing system that generates an acid in a well fluid. The acid can be used, for example, to reduce the pH of the fluid or as a breaker, activator, de-crosslinker, or acidizer in various types of well fluids. The well fluids can be used in various well services and applications.

In general, orthoesters (and polyorthoesters) have a structure described by the formula: RC(OR')(OR")(OR'''), wherein R can be hydrogen or an organic group, wherein R', R", and R''' can be an organic group but not hydrogen, and wherein R, R', R", and R''' can be the same or different. As used herein, orthoesters include polyorthoesters. Polyorthoesters are a sub-classification of orthoesters. In some polyorthoesters, the groups R, R', R", and R''' do not have to be terminal groups but can be part of the same portion of the molecule, cyclical, cyclizing on itself, or polymeric, e.g., linear or branched chain oligomers or polymers.

Figure 1:
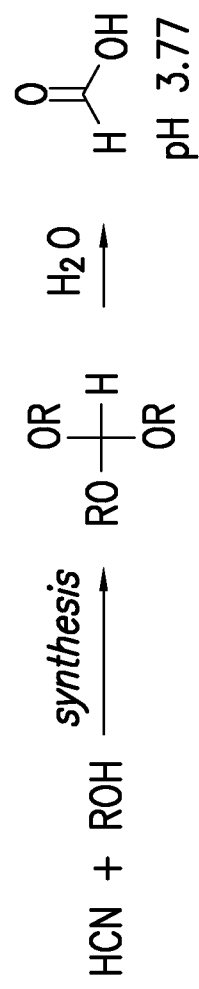
FIG. 1 illustrates a general synthesis and hydrolysis of an orthoformate ester. The orthoformate ester can be synthesized from hydrogen cyanide with an alcohol. The orthoformate hydrolyzes in the presence of acid to a formic acid (and alcohol, not shown in FIG. 1).

FIG. 1 illustrates an example of a general synthesis and hydrolysis of an orthoformate ester. The orthoformate ester can be synthesized from hydrogen cyanide with an alcohol with a metal catalyst. The orthoformate hydrolyzes in the presence of acid to a formic acid (and alcohol, not shown in FIG. 1). Without being limited by any theory, orthoesters can be useful because they and their hydrolysis products are believed to be non-damaging to a subterranean formation. For example, a triisopropyl ortho formate ester hydrolyzes to generate formic acid, pKa 3.77 (and isopropanol, not shown).

Figure 2:
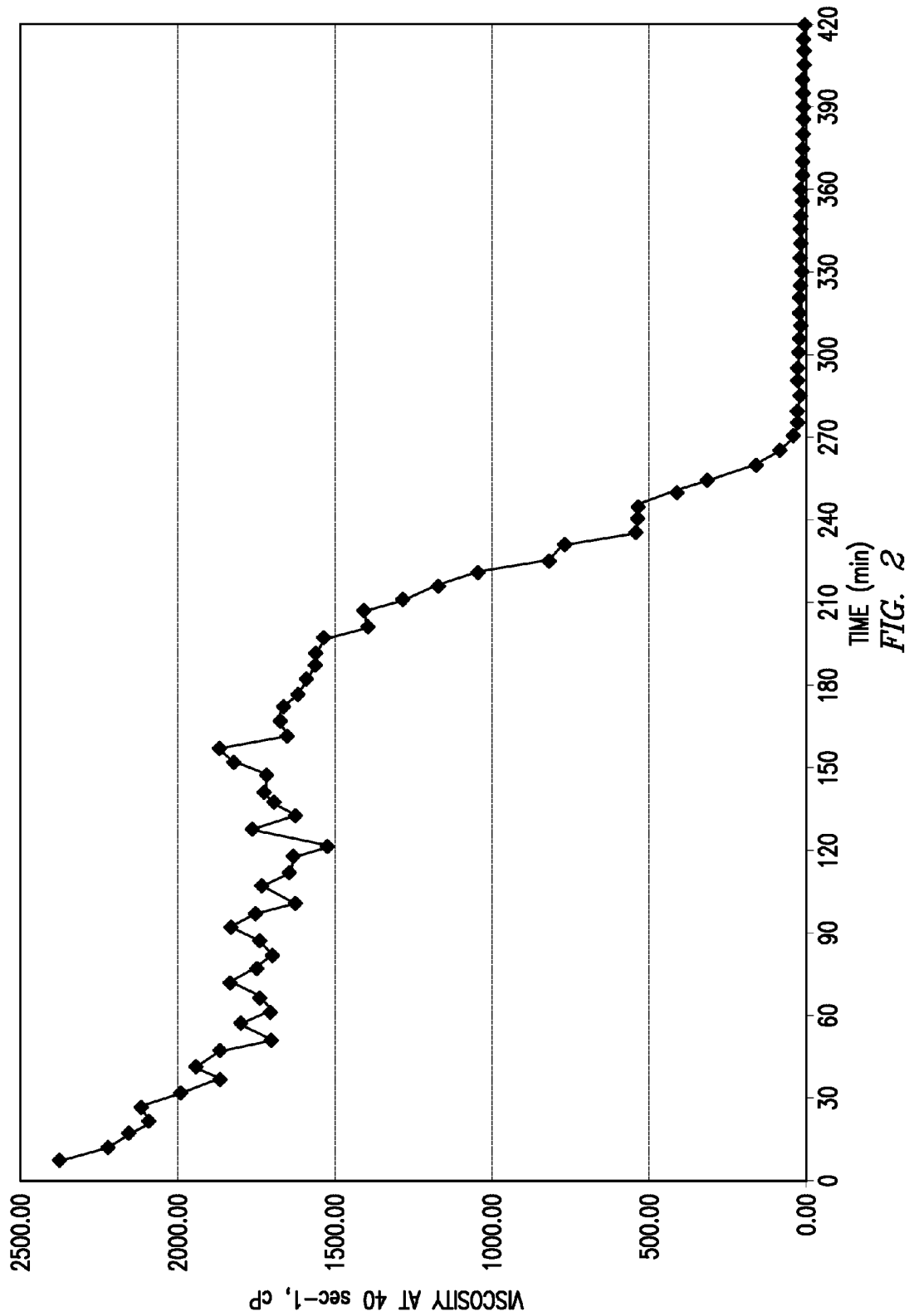
FIG. 2 is a graph of the breaking of a viscosified fluid using an orthoester, particularly a 40 lb/Mgal borate-crosslinked guar (which breaks with decreasing pH) with 40 lb/Mgal of trimethylorthoformate plus glycerol. Viscosity is measured at 40 sec$^{-1}$. The initial pH is 11.19; the final pH is 2.5. A sharp decrease in viscosity from greater than 1500 cP to very low viscosity of less than 10 cP occurs between about 3 to 5 hours.

Hydrolysis rates are thought to increase with a decreasing pH. Unlike other ester systems, which have both base and acid catalyzed saponification reactions, orthoester hydrolysis is only acid catalyzed, which means that the generation of the acid is also a catalyst for the acid generation as in autocatalytic reactions, creating very sharp and dramatic decreases in pH at well defined times. Such a sharp decrease in pH is illustrated in the graph of FIG. 2 for a polyorthoester (specifically, trimethylorthoformate+glycerol).

An orthoacetate can generate acetic acid (pKa about 4.5), whereas an orthoformate can generate formic acid (pKa about 3.77), which could generate a lower-end pH of about 4.5 or 3.8, respectively.

Problems related to such conventional orthoesters are many-fold, however. Conventional orthoesters are required in extremely high loading in order to see significant pH changes. Reaction times before the pH change occurred were in the order of longer than 4 hours, even at these high loadings. The pH ranges that could be generated with such conventional orthoesters were never lower than that of formic acid, at pH 3.7. Supply issues can also be problem, as the high loadings require obtaining high quantities, which are not readily available commercially.

According to the present invention, electron-poor orthoesters are proposed for use in various well fluids and well treatments. As used herein, an electron-poor orthoester is an orthoester that is capable of or does generate an acid having a pKa less than that for the carboxylic acid proton of formic acid, that is, less than 3.75. Instead of generating carboxylic acids such as propanoic acid, acetic acid or formic acid, electron-poor orthoesters can decompose via hydrolysis to generate a stronger carboxylic acid than formic acid. This is due to the electron-withdrawing effect on the carboxylic acid group of certain other functional groups.

In a preferred embodiment, the electron-poor orthoester is selected from the group of electron-poor orthoesters that hydrolyzes to form an acid having a pKa of less than 3. More preferably, the electron-poor orthoester is selected in the range of less than 2. Most preferably, the electron-poor orthoester is selected from the group of electron-poor orthoesters that hydrolyzes to form an acid having a pKa less than 1. For example, trichloroacetic acid, with a pKa of 0.77, which is nearly 3 pH units lower than formic acid, in order to be at the same pH as formic acid, needs to be used at $1/1000^{th}$ the concentration of formic acid.

Figure 3:
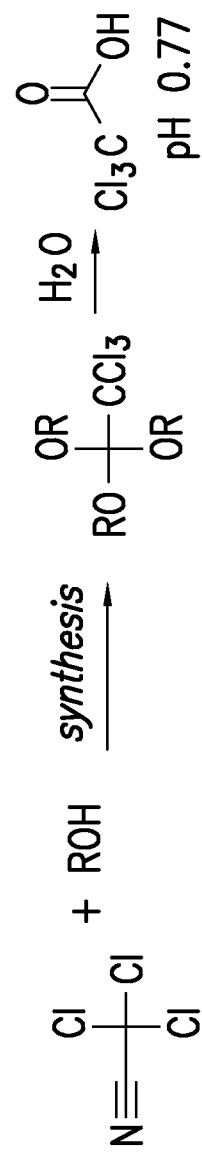
FIG. 3 illustrates a general synthesis and hydrolysis of an orthoacetate ester. The orthoacetate ester can be synthesized from trichloromethylnitrile (also known as 2,2,2-trichloroacetonitrile) with an alcohol. This electron-poor orthoformate hydrolyzes in the presence of acid to a trichloroacetic acid (and alcohol, not shown in FIG. 3).

FIG. 3 illustrates a general synthesis and hydrolysis of an orthoacetate ester. The orthoacetate ester can be synthesized from trichloromethylnitrile (also known as 2,2,2-trichloroacetonitrile) with an alcohol. This electron-poor orthoformate hydrolyzes in the presence of acid to a trichloroacetic acid (and alcohol, not shown in FIG. 3).

One reason orthoesters and poly(orthoesters) are preferred is that they are thought to generate alcohols down hole, and these alcohols can act, for example, as surface tension reducers. These alcohols may be used, for example, to clean out condensate blocks, or move or prevent water blocks in the formation, depending on how much alcohol may be generated. These alcohols may also act as hydrate inhibitors.

Delayed generation of these alcohols can be beneficial in other ways as well. For instance, the production of these alcohols downhole may give the distinct advantage of being able to provide the alcohols downhole without having to pump them. This may be beneficial, for example, in some areas, where it may be problematic to pump an alcohol (e.g., when the environment has a temperature that is greater than the flash point of the alcohol or when environmental or cultural regulations do not permit the pumping of such alcohols), the delayed generation may be useful. In addition, these generated alcohols may be preferred over standard alcohols because some standard alcohols contain chemical inhibitors that may interact with the chemistry within the well bore in such a way as to be problematic. Moreover, shipping and storing standard alcohols may be problematic.

The particular alcohol given off depends on the orthoester being used. For example, 1,1,1-trichloro-2,2,2-triethoxyethane gives off three molecules of ethanol for each molecule of tricholoro acetic acid.

In addition, however, instead of having a flammable alcohol generated, diols, glycerols, and sugar derivatives are much less flammable than short chain monoalcohols such as isopropyl alcohol. The synthesis of such orthoesters from the starting trimethyl orthoester is a simple matter. Merkli, A; Heller, J; Tabatabay, C. "Synthesis and characterization of a new biodegradable semi-solid poly(orthoester) for drug delivery systems" *J. Biomater. Sci. Polymer, Edn* 1993, 4, 505-516. In addition, they can be made solid with the proper choice of alcohol groups. This helps address issues related to chemical timing of pH reduction and healthy, safety, and environmental issues, or simple preference for the form of delivery to the well, e.g., physical state. Moreover, the alcohol group can be adjusted to be smaller or larger organic alcohols in order to adjust the rate at which the orthoester starts to decompose.

FIG. 4 presents an abbreviated listing of some of the electron-poor orthoesters that are expected to be useful according to the present invention; it is by no means comprehensive, but it may represent the most feasible commercializable chemicals. In addition, polyorthoesters of these examples are believed to be suitable. According to an embodiment of the invention, the electron-poor orthoester is selected from the group consisting of the orthoesters shown in FIG. 4. According to an embodiment of the invention, the electron-poor orthoester is selected from the group of orthoesters having at least one electron-withdrawing group vicinal to the orthoester group that is selected from the group consisting of: chlorine, fluorine, nitrile, aromatic, ester, nitro, sulfonate, and ketone.

FIG. 5 presents an abbreviated listing of some of the alcohol groups that are expected to be useful in the electron-poor orthoesters according to the present invention. According to an embodiment of the invention, the electron-poor orthoester is selected from the group consisting of the electron-poor orthoesters having an alcohol group consisting of one of the alcohol groups selected from the alcohol groups shown in FIG. 5. According to an embodiment of the invention, the electron-poor orthoester is selected from the group of electron-poor orthoesters having at least one alcohol group of the orthoester group that is selected from the group consisting of: alkyl alcohols having one to 20 carbon atoms; a glycerol; diols having 1 to 20 carbon atoms; sorbitol; monosaccharides; polysaccharides; polyols; and ether alcohols having 1 to 20 carbon atoms.

One potentially useful embodiment could generate both a stronger organic acid having a pKa less than that of formic acid and a surfactant, provided that the desired surfactant has a free alcohol and an alkyl chain, as in, for example, alkylated ethoxylates. This is a secondary goal to the reduction in the amount of material necessary for these types of systems to be activated.

The current invention is different structurally, having electron withdrawing substituents compared to simple hydrogen or alkyl groups.

According to the invention, the electron-poor orthoesters allow for use of less volume of material required for the same pH decreases, pH decrease can be greater than previous product if desired, the electron-poor orthoesters are easily manufactured, and they give no unfavorable oxidation products from reaction with formation materials.

Depending on the desired application, the orthoesters or the poly(orthoesters) may be water soluble, water insoluble, or solid. Generally, water-soluble orthoesters are easy to hydrolyze at lower temperature in comparison to water insoluble orthoesters. By making an orthoester or a poly (orthoester) more hydrophobic, the orthoester may be more suitable for use in higher temperature applications.

Also, electron-poor poly(orthoesters) made from glycerol and an electron-poor orthoformate may be water soluble depending on the number of repeating units and can be used for lower temperature applications. One of the advantages of having a poly(orthoester) over an orthoester is that it has a higher flash point and a higher viscosity. Similarly, hydrophobic poly(orthoesters) may be synthesized, which are suitable for higher temperature applications.

Those skilled in the art with the benefit of this disclosure will recognize suitable electron-poor orthoesters that may be used in a desired application. In choosing an electron-poor orthoester, one should be mindful that some orthoesters have low flash points. Various derivatives of those electron-poor orthoesters can be synthesized by transesterification with variety of alcohols, sugars, or polyols. The choice of which particular electron-poor orthoester to use should be guided by such considerations as environmental factors, and the desired delay time before a sufficient amount of acid is generated to break the fluid-loss control pill.

The electron-poor orthoesters used according to the present invention can have any suitable form. For instance, these can be used in a solution form, a particulate form, or an emulsion form. In certain applications, a solution form may be useful, e.g., when a faster break of a pill is desired; in other applications, e.g., when a slower break is desirable, a viscosified or emulsion form of the fluid with the electron-poor orthoester may be most suitable. In some embodiments, mixtures of solvents and water may be beneficial, for example, to keep the electron-poor orthoester solubilized. The gel form of the orthoester composition may be gelled with suitable polymers or surfactants. For the emulsion form, suitable emulsifiers include emulsifiers like "WS-44," which is commercially available from Halliburton Energy Services, Duncan, Okla.

An emulsion can be made with a suitable surfactant or by blending two orthoesters. For instance, an emulsion can be made between two electron-poor orthoesters if one is hydrophobic and one is hydrophilic.

To allow the orthoester to hydrolyze to produce an acid and an alcohol, a source of water is needed. The water should be present in an amount of at least about 2 moles of water for about every 1 mole of orthoester functionality to an excess of water. One of ordinary skill in the art with the benefit of this disclosure will recognize whether a suitable amount of water is present in a well fluid, or otherwise in the well bore for a desired application.

The electron-poor orthoesters of the present invention are believed to be generally stable at a pH of about 8 or above. To maintain the delay, preferably the pH should be maintained at 8 or above.

To maintain this pH, a well fluid with the electron-poor orthoester may include an inhibitor. The inhibitor may further delay the generation of the acid, and may neutralize the generated acid during the delay period. Suitable inhibitors include bases. Examples of some preferred inhibitors may include sodium hydroxide, potassium hydroxide, magnesium oxide, magnesium hydroxide, calcium oxide, calcium hydroxide, amines (such as hexamethylenetetramine), sodium carbonate, potassium carbonate, derivatives of these, and combinations of these. In certain embodiments, a small amount of a strong base as opposed to a large amount of a relatively weak base is preferred to achieve the delayed generation of the acid and the neutralization of the generated acid for a desired delay period.

These electron-poor orthoesters will generate an acid down hole in a delayed fashion. The electron-poor orthoesters may be reacted with small amounts of reactive materials such as mineral acids, organic acids, acidic anhydrides, p-toluenesulfonic acid, etc. to lower the pH to accelerate the hydrolysis of the electron-poor orthoester. Similarly, the hydrolysis rate may be slowed by the addition of a small amount of a strong base such as NaOH, $Na_2CO_3$, and $Mg(OH)_2$.

Depending on the pH of the well fluid containing the electron-poor orthoester before generating acid and raising the pH, the electron-poor orthoester may need to be incorporated in a certain manner depending on the stability to the pH of the well fluid. This is because the degradation of orthoesters and poly(orthoesters) is thought to be acid-catalyzed. If the well fluid has a pH of 6 or greater, preferably greater than 8, then the orthoester can be incorporated directly in the fluid with little risk of negatively impacting it, followed by the inhibitor if desired. Optionally, an emulsifying surfactant may be added to keep the electron-poor orthoester dispersed in the well fluid. A pH as low as 6 is fine if the orthoester is very hydrophobic and not miscible with water. In that case the water molecule cannot reach the bond to break it. But for hydrophilic orthoesters, a pH below 8 is expected to rapidly generate more acid, which would autocatalyze the hydrolysis reaction within an undesirably short time of as little as 5 minutes to 30 minutes.

It may be desirable to run electron-poor orthoester mixtures, depending on which ones are chosen, with an eye toward how resulting salts will be produced in the formation, since salts can precipitate in the formation. To avoid undesirable salt precipitation problems, it may be desirable to combine different orthoesters to keep each of the resulting salts below the over saturation concentration that would cause salts to precipitate in formation, but still achieve the acid potential necessary for the purpose of the well fluid. To choose the appropriate electron-poor orthoester and the right concentration of that compound, one should balance, inter alia, salt precipitation and acid dissolving power concentration concerns. One of ordinary skill in the art with the benefit of this disclosure should know how to balance the factors so that salts do not saturate.

The concentration of the electron-poor orthoester in a well fluid of the present invention may range from about 1% to about 100%. In some embodiments, this may be from about 0.01% to about 10% based on the volume of the continuous phase of the well fluid. The particular concentration used in any particular embodiment depends on what electron-poor orthoester is being used, and what percentage of acid is generated. Other complex, interrelated factors that may be considered in deciding how much concentration of an electron-poor orthoester to use in a well fluid include, but are not limited to, the composition of the subterranean formation (e.g., carbonate), the design temperature or bottom hole static temperature, the pressure of the formation, the particular fines and damage present in the formation (e.g., scale, skin, calcium carbonate, silicates, and the like), the expected contact time of the generated acid with another fluid downhole or the formation, etc.

DEFINITIONS AND USAGES

Interpretation

The words or terms used herein have their plain, ordinary meaning in the field of this disclosure, except to the extent explicitly and clearly defined in this disclosure.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, oil and gas are understood to refer to crude oil and natural gas. Oil and gas are naturally occurring hydrocarbons in certain subterranean formations.

A "subterranean formation" is a body of rock that has sufficiently distinctive characteristics and is sufficiently continuous for geologists to describe, map, and name it. A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Reservoirs can be of various rock materials. As used herein, a subterranean formation having greater than 50% by weight of inorganic carbonate materials (e.g., limestone or dolomite) is referred to as a "carbonate formation." As used herein, a subterranean formation having greater than 50% by weight of inorganic silicatious materials (e.g., sandstone) is referred to as a "sandstone formation."

Well Terms

A "well" includes a wellhead and at least one wellbore from the wellhead penetrating the earth. The "wellhead" is the surface termination of a wellbore, which surface may be on land or on a seabed. A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, e.g., liquid water or steam, to drive oil or gas to a production wellbore.

As used herein, introducing "into a well" means introduced at least into and through the wellhead. According to various techniques known in the art, tubulars, equipment, tools, or well fluids can be directed from the wellhead into any desired portion of the wellbore.

As used herein, a "well fluid" broadly refers to any fluid adapted to be introduced into a well for any purpose. A well fluid can be, for example, a drilling fluid, a cementing composition, a treatment fluid, or a spacer fluid. If a well fluid is to be used in a relatively small volume, for example less than about 200 barrels (32 m$^3$), it is sometimes referred to as a wash, dump, slug, or pill.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

A zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

Unless the specific context otherwise requires, a well fluid or treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of well fluid can be varied or several different types of well fluids can be used.

As used herein, a downhole fluid is an in-situ fluid in a well, which may be the same as a well fluid at the time it is introduced, or a well fluid mixed with another other fluid downhole, or a fluid in which chemical reactions are occurring or have occurred in-situ downhole.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular well fluid or stage of a well service. For example, a fluid can be designed to have components that provide a minimum viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment at the time of a well treatment. That is, design temperature takes into account not only the bottom hole static temperature ("BHST"), but also the effect of the temperature of the well fluid on the BHST during treatment. The design temperature is sometimes referred to as the bottom hole circulation temperature ("BHCT"). Because treatment fluids may be considerably cooler than BHST, the difference between the two temperatures can be quite large. Ultimately, if left undisturbed, a subterranean formation will return to the BHST.

Physical States and Phases

As used herein, "phase" is used to refer to a substance having a chemical composition and physical state that is distinguishable from an adjacent phase of a substance having a different chemical composition or different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particle Terms

As used herein, unless the context otherwise requires, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions.

As used herein, "particulate" or "particulate material" refers to matter in the physical form of distinct particles in a solid or liquid state (which means such an association of a few atoms or molecules). A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

The term "particulate" as used herein is intended to include material particles having the physical shape of platelets, shavings, flakes, ribbons, rods, strips, spheroids, toroids, pellets, tablets or any other physical shape.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified a number of different ways, including based on the size of the dispersed particles, the uniformity or lack of uniformity of the dispersion, and, if a fluid, whether or not precipitation occurs.

A dispersion is considered to be heterogeneous if the dispersed particles are not dissolved and are greater than about 1 nanometer in size. (For reference, the diameter of a molecule of toluene is about 1 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Solubility Terms

A substance is considered to be "soluble" in a liquid if at least 10 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or fluid composition, can be a substance that makes the chemical species chemically available immediately or it can be a substance that gradually or later releases the chemical species to become chemically available.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

As used herein, a fluid is a substance that behaves as a fluid under Standard Laboratory Conditions, that is, at 77° F. (25° C.) temperature and 1 atmosphere pressure, and at the higher temperatures and pressures usually occurring in subterranean formations without applied shear.

Every fluid inherently has at least a continuous phase. A fluid can have more than one phase. The continuous phase of a well fluid is a liquid under Standard Laboratory Conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid Standard Laboratory Conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Two fluids are incompatible if undesirable physical or chemical interactions occur when the fluids are mixed. Incompatibility is characterized by undesirable changes in apparent viscosity and shear stresses. When apparent viscosity of the mixed fluids is greater than apparent viscosity of each individual fluid, they are said to be incompatible at the tested shear rate.

Apparent Viscosity of a Fluid

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant sear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. In the oilfield and as used herein, unless the context otherwise requires it is understood that a reference to viscosity is actually a reference to an apparent viscosity. Apparent viscosity is commonly expressed in units of centipoise ("cP").

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress that will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, unless otherwise specified or the context otherwise requires, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 35 or 50 viscometer or a Chandler 5550 HPHT viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Unless otherwise specified, the apparent viscosity of a fluid (excluding any suspended solid particulate larger than silt) is measured with a Fann Model 50 type viscometer using an R1 rotor, B1 bob, and F1 torsion spring at a shear rate of 40 l/s, and at a temperature of 77° F. (25° C.) and a pressure of 1 atmosphere. For reference, the viscosity of pure water is about 1 cP.

A substance is considered to be a fluid if it has an apparent viscosity less than 5,000 cP (independent of any gel characteristic).

As used herein, a fluid is considered to be "viscous" if it has an apparent viscosity of 10 cP or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of 5 cP or lower.

General Measurement Terms

Unless otherwise specified or unless the context otherwise clearly requires, any ratio or percentage means by weight.

Any doubt regarding whether units are in U.S. or Imperial units, where there is any difference, U.S. units are intended. For example, "gal/Mgal" means U.S. gallons per thousand U.S. gallons.

General Description of Common Well Treatments and Well Fluids

Hydraulic Fracturing

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

The formation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells.

Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

In one common type of gravel packing, a mechanical screen is placed in the wellbore and the surrounding annulus is packed with a particulate of a larger specific size designed to prevent the passage of formation sand or other fines. It is also common, for example, to gravel pack after a fracturing procedure, and such a combined procedure is sometimes referred to as a "frac-packing"

Suspending a Particulate in a Well Fluid

In certain applications, such as hydraulic fracturing or gravel packing, a well fluid can be adapted to be a carrier fluid for a particulate.

For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

For example, a proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing the viscosity of a well fluid can help prevent a particulate having a different specific gravity than an external phase of the fluid from quickly separating out of the external phase.

A viscosity-increasing agent can be used to increase the ability of a fluid to suspend and carry a particulate material in a well fluid. A viscosity-increasing agent can be used for other purposes, such as matrix diversion, conformance control, or friction reduction.

A viscosity-increasing agent is sometimes referred to in the art as a viscosifying agent, viscosifier, thickener, viscosity-increasing agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

Any viscosity-increasing agent suitable for use in subterranean applications may be used in these fluids, including, but not limited to, natural biopolymers, synthetic polymers, cross linked viscosity-increasing agents, viscoelastic surfactants, and the like.

In addition, there are other techniques for increasing the viscosity of a fluid, including, for example, forming an emulsion.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Treatment fluids used in high volumes, such as fracturing fluids, are usually water-based. Efficient and inexpensive viscosity-increasing agents for water include certain classes of water-soluble polymers.

As will be appreciated by a person of skill in the art, the dispersibility or solubility in water of a certain kind of polymeric material may be dependent on the salinity or pH of the water. Accordingly, the salinity or pH of the water can be modified to facilitate the dispersibility or solubility of the water-soluble polymer. In some cases, the water-soluble polymer can be mixed with a surfactant to facilitate its dispersibility or solubility in the water or salt solution utilized.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

Synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-viscosity-increasing agents are polymers or copolymers consisting of various ratios of acrylic, acrylamide, acrylamidemethylpropane sulfonic acid, quaternized dimethylaminoethylacrylate, quaternized dimethylaminoethylmethacrylate, combinations thereof, and the like. Examples may be shown in these references, the disclosures of which are incorporated herein by reference, Chatterji, J. and Borchardt, J. K.: "Application of Water-Soluble Polymers in the Oilfield," paper SPE 9288 presented at the 1980 Annual Technical Conference, Dallas, Tex., September 21-24; Norman, L. R., Conway, M. W., and Wilson, J. M.: "Temperature-Stable Acid Gelling Polymers: Laboratory Evaluation and Field Results," paper SPE 10260 presented at the 1981 Annual Technical Conference, San Antonio, Tex., October 5-7; Bouwmeester, Ron, C. M. U.S. Patent Application 2005/0197257; Tackett, Jr., U.S. Pat. No. 5,082,056; Crowe, Curtis, W. European Patent Application 0 278 540; and Nehmer, Warren L GB 2163790.

If used, a viscosity-increasing agent may be present in the well fluids in a concentration in the range of from about 0.01% to about 5% by weight of the continuous phase therein.

Viscoelastic Surfactants for Increasing Viscosity

It should be understood that merely increasing the viscosity of a fluid may only slow the settling or separation of distinct phases and does not necessarily stabilize the suspension of any particles in the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the three-dimensional association of surfactant molecules to form viscosifying micelles. When the concentration of the viscoelastic surfactant in a viscoelastic fluid significantly exceeds a critical concentration, and in most cases in the presence of an electrolyte, surfactant molecules aggregate into species such as micelles, which can interact to form a network exhibiting elastic behavior.

As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure.

These micelles may function, among other purposes, to stabilize emulsions, break emulsions, stabilize a foam, change the wettability of a surface, solubilize certain materials, or reduce surface tension. When used as a viscosity-increasing agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid or forming a gel. Certain viscosifying micelles may impart increased viscosity to a fluid such that the fluid exhibits viscoelastic behavior (e.g., shear thinning properties) due, at least in part, to the association of the surfactant molecules contained therein.

Moreover, because the viscosifying micelles may be sensitive to pH and hydrocarbons, the viscosity of these viscoelastic surfactant fluids may be reduced after introduction into the subterranean formation without the need for certain types of gel breakers (e.g., oxidizers). This may allow a substantial portion of the viscoelastic surfactant fluids to be produced back from the formation without the need for expensive remedial treatments.

As used herein, the term "surfactant gel" refers to fluids that exhibit or is capable of exhibiting viscoelastic behavior due, at least in part, to the association of surfactant molecules contained therein to form viscosifying micelles.

Viscoelastic surfactants may be cationic, anionic, or amphoteric in nature. The viscoelastic surfactants can include any number of different compounds, including methyl ester sulfonates, hydrolyzed keratin, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

Examples of ester sulfonate are described in the following, each of which is incorporated herein by reference in the entirety:

U.S. Pat. No. 7,299,874 issued Nov. 27, 2007 having for named inventors Thomas D. Welton, Samuel J. Lewis; and Gary P. Funkhouser entitled "Viscoelastic Surfactant Fluids and Associated Methods";

U.S. Pat. No. 7,159,659 issued Jan. 9, 2007 having for named inventors Thomas D. Welton and Samuel J. Lewis entitled "Viscoelastic surfactant fluids and associated acidizing methods";

U.S. Pat. No. 7,303,019 issued Dec. 4, 2007 having for named inventors Thomas D. Welton, Samuel J. Lewis, and Gary P. Funkhouser entitled "Viscoelastic surfactant fluids and associated diverting methods"; and U.S. Patent Publication No. 2006/0183646 published Aug. 17, 2006 having for named inventors Thomas D. Welton, Samuel J. Lewis, and Gary P. Funkhouser entitled "Viscoelastic surfactant fluids and associated methods."

A particular surfactant that may be useful is a methyl ester sulfonate ("MES") surfactant. Suitable MES surfactants are disclosed in patent application Ser. Nos. 11/058,475, 11/058,611, 11/058,612, and 11/058,660, the disclosures of which are incorporated by reference.

Examples of ethoxylated fatty amines are described in the following, each of which is incorporated herein by reference in the entirety:

U.S. Pat. No. 4,061,580 issued Dec. 6, 1977 having for named inventor Jahnke Richard William entitled "Thickened Aqueous Compositions for Well Treatment";

U.S. Pat. No. 4,324,669 issued Apr. 13, 1982 having for named inventors Lewis R. Norman and Tommy R. Gardner entitled "Foamed High Viscosity Aqueous Inorganic Acid Solutions and Methods of Using the Same"; and U.S. Pat. No. 4,215,001 issued Jul. 29, 1980 having for named inventors Eugene A. Elphingstone, Marvin D. Misak, and James E. Briscoe entitled "Methods of Treating Subterranean Well Formations."

Suitable viscoelastic surfactants may be mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738 issued May 16, 2001 having for named inventors Jiten Chatterji, Roger S. Cromwell, Frank Samora, and Bobby J. King entitled "Foamed Well Cement Slurries, Additives, and Methods," which is incorporated herein by reference in its entirety.

Examples of commercially-available viscoelastic surfactants include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), ETHO-QUAD O/12 PG™ (a fatty amine ethoxylate quat surfactant available from Akzo Nobel Chemicals, Chicago, Ill.), ETHOMEEN T/12™ (a fatty amine ethoxylate surfactant available from Akzo Nobel Chemicals, Chicago, Ill.), ETHOMEEN S/12™ (a fatty amine ethoxylate surfactant available from Akzo Nobel Chemicals, Chicago, Ill.), and REWOTERIC AM TEG™ (a tallow dihydroxyethyl betaine amphoteric surfactant available from Degussa Corp., Parsippany, N.J.). See, for example, U.S. Pat. No. 7,727,935 issued Jun. 1, 2010 having for named inventor Thomas D. Welton entitled "Dual-Function Additives for Enhancing Fluid Loss Control and Stabilizing Viscoelastic Surfactant Fluids," which is incorporated herein by reference in the entirety.

The viscoelastic surfactant should be present in a fluid in an amount sufficient to provide the desired viscosity (e.g., sufficient viscosity to divert flow, reduce fluid loss, suspend particulates, etc.) therein through formation of viscosifying micelles. In certain embodiments, the surfactant may be present in an amount in the range of from about 0.01% to about 20% by volume of the continuous phase of the fluid. In certain embodiments, the surfactant may be present in an amount in the range of from about 0.02% to about 10% by volume of the continuous phase of the fluid.

Crosslinking of Viscosity-Increasing Agent

The viscosity of a fluid at a given concentration of viscosity-increasing agent can be greatly increased by crosslinking the viscosity-increasing agent. A crosslinking agent, which is sometimes referred to as a crosslinker, can be used for this purpose. A crosslinker interacts with at least two molecules of the viscosity-increasing agent to form a "crosslink" between them.

If crosslinked to a sufficient extent, the viscosity-increasing agent may form a gel with water. Gel formation is based on a number of factors including the particular viscosity-increasing agent and concentration thereof, the particular crosslinker and concentration thereof, the degree of crosslinking, temperature, and a variety of other factors known to those of ordinary skill in the art.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

Cross-linking agents typically comprise at least one metal ion that is capable of cross-linking the viscosity-increasing agent molecules.

For a polymeric viscosity-increasing agent, any crosslinking agent that is suitable for crosslinking the chosen monomers or polymers may be used. Crosslinking agents include, for example, crosslinking agents of at least one metal ion that is capable of crosslinking molecules of the viscosity-increasing agent. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds;

chromium compounds; iron compounds (such as, for example, iron chloride); copper compounds; zinc compounds; sodium aluminate; or a combination thereof. In certain applications, borate compounds may also be used.

Where present, the cross-linking agent generally should be included in the fluids in an amount sufficient, among other things, to provide the desired degree of cross-linking. In some embodiments, the cross-linking agent may be present in the treatment fluids in an amount in the range of from about 0.01% to about 5% by weight of the treatment fluid.

Fluid-Loss Control

Fluid loss refers to the undesirable leakage of a fluid phase of any type of well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with a fluid-loss control material that blocks the permeability at or near the face of the rock matrix of the zone.

For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filtercake. Depending on the nature of a fluid phase and the filtercake, such a filtercake may help block the further loss of a fluid phase (referred to as a filtrate) into the subterranean formation. A fluid-loss control material is specifically designed to lower the volume of a filtrate that passes through a filter medium.

Fluid-loss control materials are sometimes used in drilling fluids or in treatments that have been developed to control fluid loss. A fluid-loss control pill is a treatment fluid that is designed or used to provide some degree of fluid-loss control. Through a combination of viscosity, solids bridging, and cake buildup on the porous rock, these pills oftentimes are able to substantially reduce the permeability of a zone of the subterranean formation to fluid loss. They also generally enhance filter-cake buildup on the face of the formation to inhibit fluid flow into the formation from the wellbore.

Fluid-loss control pills typically include an aqueous continuous phase and a high concentration of a viscosifying agent (usually crosslinked), and sometimes, a bridging particulate, like graded sand, graded salt particulate, or sized calcium carbonate particulate.

The particulate used for fluid-loss control purposes can be, for example, self-degradable or acid degradable.

Damage to Permeability

In well treatments using viscous well fluids, the material for increasing the viscosity of the fluid can damage the permeability of the proppant pack or the matrix of the subterranean formation. For example, a treatment fluid can include a polymeric material that is deposited in the fracture or within the matrix. By way of another example, the fluid may include surfactants that leave unbroken micelles in the fracture or change the wettability of the formation in the region of the fracture.

After application of a filtercake, it may be desirable to restore permeability into the formation. If the formation permeability of the desired producing zone is not restored, production levels from the formation can be significantly lower. Any filtercake or any solid or polymer filtration into the matrix of the zone resulting from a fluid-loss control treatment must be removed to restore the formation's permeability, preferably to at least its original level. This is often referred to as clean up.

The term "damage" as used herein refers to undesirable deposits in a subterranean formation that may reduce its permeability. Scale, skin, gel residue, and hydrates are contemplated by this term.

Examples of Acid Uses in Well Treatments and Well Fluids

Breaker for Viscosity of Fluid

After a treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of treatment fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds existing between polymer chains.

In the case of a crosslinked viscosity-increasing agent, for example, one way to diminish the viscosity is by breaking the crosslinks. For example, the borate crosslinks in a borate-crosslinked polymer can be broken by lowering the pH of the fluid. At a pH above 8, the borate ion exists and is available to crosslink and cause an increase in viscosity or gelling. At a lower pH, the borate ion reacts with proton and is not available for crosslinking, thus, an increase in viscosity due to borate crosslinking is reversible. In contrast, crosslinks formed by zirconium, titanium, antimony, and aluminum compounds, however, are such crosslinks are considered to be non-reversible and are broken by other methods than controlling pH.

Thus, removal of the treatment fluid is facilitated by using one or more breakers to reduce fluid viscosity.

Unfortunately, another complicating factor exists. Because of the large size of the polymer, a filtration process can occur upon the face of a formation or fracture in conventional formation. A filtercake of the polymer can be formed while the aqueous fluid, KCl, and breakers pass into the matrix of the formation. Careful examination of this filtercake, which may be formed from crosslinked or uncrosslinked guar or other polymer, reveals a semi-elastic, rubberlike membrane. Once the polymer concentrates, it is difficult to solubilize the polymer. For example, a non-filtercake fluid may consist of approximately 99.5 percent water and 0.5 percent polymer. Accordingly, for example, when the fracture closes in a fracturing treatment, the permeability of the proppant bed or the formation face may be severely damaged by the polymer filtercake. Viscosified gravel pack fluids need breakers, too. A filtercake deposited for fluid-loss control may also need a breaker to help remove the filtercake.

Breakers must be selected to meet the needs of each situation. First, it is important to understand the general performance criteria of breakers. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained.

A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature. A typical gravel pack break criteria is a minimum 4-hour break time.

Chemical breakers used to reduce viscosity of a well fluid viscosified with a viscosity-increasing agent or to help remove a filtercake formed with such a viscosity-increasing agent are generally grouped into three classes: oxidizers, enzymes, and acids.

For a polymeric viscosity-increasing agent, the breakers operate by cleaving the backbone of polymer by hydrolysis of acetyl group, cleavage of glycosidic bonds, oxidative/reductive cleavage, free radical breakage, or a combination of these processes.

For surfactant gels, there are two principal methods of breaking: dilution with formation fluids and chemical breakers, such as acids.

Dilution with formation fluids is an unreliable method. For example, in oilfield applications, the viscosity of viscoelastic surfactant gels may be reduced or lost upon exposure to formation fluids (e.g., crude oil, condensate or water); and this viscosity reduction or loss effectuates cleanup of the reservoir, fracture, or other treated area. In some circumstances, it is desirable to have a better control of that breaking, for instance, when breaking of the fluid is desired at a particular time or condition, when it is desired to accelerate viscosity reduction, or when the natural influx of reservoir fluids (for example, in dry gas reservoirs) does not break or breaks incompletely the viscoelastic surfactant gel.

In some cases, chemical breaking of a surfactant gel can be more reliable. Various types of alcohols, organic acids, enzymes, transition metals (e.g., iron), and salts are known to impart a reduction of the viscosity of a viscoelastic gel or even to completely "break" a surfactant gel.

As used herein, to "break," in regard to an emulsion, means to cause the creaming and coalescence of emulsified drops of the internal dispersed phase so that the internal phase separates out of the external phase. For example, breaking an emulsion can be accomplished mechanically (for example, in settlers, cyclones, or centrifuges), or via dilution, or with chemical additives to increase the surface tension of the internal droplets.

Using chemical breakers (such as acid) for any viscosity-increasing agent or viscosified well fluid can be complicated. Such chemical breakers may be added to a pad or a pre-pad fluid, or they may be used in such a way as the mechanism relies upon melting, slow dissolution of a solid, de-adsorption of a breaking agent absorbed into a solid particle, or the breaking of a coating (encapsulated breaker). Oftentimes, such breaker remains in the fractures in the subterranean formation, and as a result, does not contact the viscous fluid to a sufficient extent to break the viscosity. Moreover, if the breaker is a solid breaker, the breaker may settle out of the fluid, which can result in an inefficient or premature break of the fluid.

Therefore, among other needs, there is a need for additional methods for breaking well fluids having increased viscosity, at predetermined times or conditions or when they are not broken by the natural influx of reservoir fluids.

Acidizing Treatments

A widely used stimulation technique is acidizing, in which a treatment fluid including or forming an aqueous acid solution is introduced into the formation to dissolve acid-soluble materials. This can accomplish a number of purposes, which can be, for example, to help remove residual fluid material or filtercake damage or to increase the permeability of a treatment zone. In this way, hydrocarbon fluids can more easily flow from the formation into the well. In addition, an acid treatment can facilitate the flow of injected treatment fluids from the well into the formation. This procedure enhances production by increasing the effective well radius.

In addition, acidizing techniques can be carried out as matrix acidizing procedures or as acid fracturing procedures.

In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock. Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

In acid fracturing, an acidizing fluid is pumped into a zone at a sufficient pressure to cause fracturing of the formation and creating differential (non-uniform) etching fracture conductivity. Acid fracturing involves the formation of one or more fractures in the formation and the introduction of an aqueous acidizing fluid into the fractures to etch the fractures faces, whereby flow channels are formed when the fractures close. The aqueous acidizing fluid also enlarges the pore spaces in the fracture faces and in the formation. In acid fracturing treatments, one or more fractures are produced in the formation and the acidic solution is introduced into the fracture to etch flow channels in the fracture face. The acid also enlarges the pore spaces in the fracture face and in the formation. Greater details, methodology, and exceptions can be found in "Production Enhancement with Acid Stimulation" $2^{nd}$ edition by Leonard Kalfayan (PennWell 2008), SPE 129329, SPE 123869, SPE 121464, SPE 121803, SPE 121008, IPTC 10693, 66564-PA, and the references contained therein.

Unless otherwise clear from the context, the use of the term "acidizing" herein refers to both matrix and fracturing types of acidizing treatments, and more specifically, refers to the general process of introducing an acid down hole to perform a desired function, e.g., to acidize a portion of a subterranean formation or any damage contained therein.

Fluid Compositions

Water-Based or Oil-Based Fluid

The continuous liquid phase of a well fluid according to the invention can be either water-based or oil-based. In an embodiment, the well fluid is water-based. Oil-based fluids may be useful, however, in water sensitive formations or for providing an organic acid downhole.

The continuous liquid fluid should be chosen based on its compatibility with the formation and the electron-poor orthoester.

Water-Based Fluid

According to an embodiment of the invention, a water-based well fluid is provided, the fluid including: (A) a continuous aqueous phase having a pH of a least 8; (B) an electron-poor orthoester; and (C) a viscosity-increasing agent.

The continuous water phase can comprise fresh water, saltwater (e.g., water containing one or more salts dissolved therein), brine, seawater, or derivatives and combinations thereof. Generally, the water may be from any source, treated or untreated, provided that it does not contain certain concentrations of components that might adversely affect the stability or performance of the well fluid.

In an embodiment, the well fluid is an emulsion.

In an embodiment, the well fluid includes at least proppant, gravel, or fluid-loss control particulate.

In another embodiment, the well fluid is viscous, wherein the viscosity of the well fluid can be broken by reducing the pH of the continuous phase of the fluid.

In yet another embodiment, the well fluid comprises a compound that generates hydrofluoric acid by reacting with another acid. An example of a source of hydrofluoric acid in an acidic environment is ammonium bifluoride, It is to be understood that various combinations of these embodiments of the fluid can used in the same well fluid, if desired for a particular application.

Density and Salts

In certain embodiments, the density of the continuous water phase can be increased, among other purposes, to provide well control properties or provide additional particle transport and suspension in a fluid.

The well fluids optionally can include one or more salts, among other purposes, to modify the rheological properties (e.g., viscosity) of the fluids. The salts may be inorganic or organic.

Examples of suitable inorganic salts include water-soluble potassium, sodium, and ammonium salts, (such as potassium chloride and ammonium chloride), calcium chloride, calcium bromide, magnesium chloride and zinc halide salts.

Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride.

Where included, the one or more salts may be present in an amount in the range of from about 0.1% to about 30% by weight of the viscoelastic surfactant fluid. In certain embodiments, the one or more salts may be present in an amount in the range of from about 0.1% to about 10% by weight of the viscoelastic surfactant fluid.

The type and amount of salts suitable in a particular application may depend upon a variety of factors. A person of ordinary skill, with the benefit of this disclosure, will recognize when to include a salt in a particular application, as well as the appropriate type and amount of salt to include.

pH and pH Adjuster

In certain embodiments, the treatment fluids can include a pH-adjuster. Preferably, the pH adjuster does not have undesirable properties, as discussed above.

The pH-adjuster may be present in the treatment fluids in an amount sufficient to maintain or adjust the pH of the fluid.

In some embodiments, a pH-adjuster may be included in the treatment fluid, inter alia, to adjust the pH of the treatment fluid to, or maintain the pH of the treatment fluid near, a pH that balances the duration of certain properties of the treatment fluid.

In certain embodiments, the pH-adjuster comprises a salt of an organic acid such as sodium or potassium formate, sodium or potassium acetate, sodium or potassium citrate, sodium or potassium glycolate, sodium or potassium maleate, sodium or potassium phosphate, potassium dihydrogen phosphate, cesium formate, and any combinations thereof. These can be used to help adjust the pH above 8 or to decrease the pH to break the orthoesters, as desired.

In some embodiments, the pH-adjuster may comprise a small amount of a strong base such as NaOH, $Na_2CO_3$, and $Mg(OH)_2$.

In other embodiments, the pH-adjuster may be any other substance known in the art capable of maintaining the pH of the breaker in a limited range. One of ordinary skill in the art, with the benefit of this disclosure, will recognize the appropriate pH-adjuster and amount thereof to use for a chosen application.

Emulsified Fluids

If desired, a well fluid can be in the form of an emulsion.

An emulsion is a fluid including a dispersion of immiscible liquid particles in an external liquid phase. In addition, the proportion of the external and internal phases is above the solubility of either in the other. A chemical can be included to reduce the interfacial tension between the two immiscible liquids to help with stability against coalescing of the internal liquid phase, in which case the chemical may be referred to as a surfactant, an emulsifier, or emulsifying agent.

An emulsion can be an oil-in-water (o/w) type or water-in-oil (w/o) type. A water-in-oil emulsion is sometimes referred to as an invert emulsion. In the context of an emulsion, a "water phase" refers to a phase of water or an aqueous solution and an "oil phase" refers to a phase of any non-polar organic liquid that is immiscible with water, such as petroleum, kerosene, or synthetic oil.

Using an emulsion may be beneficial because it would have an inherently higher viscosity than the external phase. In addition, depending on external phase, one could control the rate of reaction with the acid soluble materials in the subterranean formation. Another potential benefit is that potential corrosion problems (if any) can be managed, especially by using an oil external phase. These emulsions are also good for solids transport. Other benefits and advantages to using emulsions in the methods of the present invention will be evident to one of ordinary skill in the art.

As used herein, an emulsifier refers to a surfactant that helps prevent the droplets of the dispersed phase of an emulsion from flocculating or coalescing in the emulsion.

An emulsifier can be or include a cationic, a zwitterionic, or a nonionic emulsifier. A surfactant package can include one or more different chemical surfactants.

Suitable emulsifying surfactants include nonionic surfactants such as sorbitan esters, AF-61™ Emulsifier, and AF-70™ Emulsifier.

The emulsifier can be selected from the group consisting of ethoxylated fatty molecules, betaines, glucosides, ethyleneoxide-propylene oxide copolymers, quaternized ethoxylated fatty materials or ethoxylated amines, and any combination thereof in any proportion. Ethoxylated surfactants preferably have a normal distribution of ethylene oxide groups in the range of 10 monomer units to 200 monomer units. More preferably, the length of the ethylene oxide portion of the nonionic surfactant has a normal distribution in the range of 20 monomer units to 50 monomer units.

The emulsion may also contain a co-emulsifier such as poly(vinyl alcohol) or pluronic or tetronic surfactant that may be used in conjunction with the surfactants mentioned above.

The emulsifier is preferably in a concentration of at least 1% by weight of the water of the emulsion. More preferably, the emulsifier is in a concentration in the range of 1% to 10% by weight of the water.

The internal-phase droplets of an emulsion disrupt streamlines and require more effort to get the same flow rate. Thus, an emulsion tends to have a higher viscosity than the external phase of the emulsion would otherwise have by itself. This property of an emulsion can be used to help suspend a particulate material in an emulsion. This technique for increasing the viscosity of a liquid can be used separately or in combination with other techniques for increasing the viscosity of a fluid.

As used herein, to "break," in regard to an emulsion, means to cause the creaming and coalescence of emulsified drops of the internal dispersed phase so that the internal phase separates out of the external phase. Breaking an emulsion can be accomplished mechanically (for example, in settlers, cyclones, or centrifuges) or with chemical additives to increase the surface tension of the internal droplets.

Foamed Fluids

A foamed fluid is fluid having a liquid external phase that includes a dispersion of undissolved gas bubbles that foam the liquid, usually with the aid of a chemical (a foaming agent) in the liquid phase to achieve stability.

Any suitable gas may be used for foaming, including nitrogen, carbon dioxide, air, or methane. A foamed treatment fluid may be desirable to, among other things, reduce the amount of fluid that is required in a water sensitive subterranean formation, to reduce fluid loss in the formation, or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole temperatures and pressures involved in a particular application. One of ordinary skill in the art, with the benefit of this disclosure, will recognize how much gas, if any, to incorporate into a foamed treatment fluid.

Where it is desirable to foam a treatment fluid, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable foaming agents and foam stabilizing agents may be included as well, which will be known to those skilled in the art with the benefit of this disclosure.

Other Additives

Well fluids according to the invention can optionally include other acid-generating compounds, active acids, or other delayed-release acids. Suitable acids could include hydrochloric acid, hydrofluoric acid, formic acid, and acetic acid. Hydrogen fluoride generating compounds include, for example, ammonium bifluoride and ammonium fluoride. Others may be suitable as well. These may be used, for example, in an acidizing application.

If desired, the well fluids can optionally comprise a viscosity-increasing agent and, if desired, a cross-linking agent for the viscosity-increasing agent.

The well fluids according to the invention optionally can include one or more of a variety of well-known additives, such as gel stabilizers, inorganic water-soluble salts, salt substitutes (such as trimethyl ammonium chloride), fluid loss control additives, particulates, acids, catalysts, clay stabilizers, biocides, friction reducers, additional surfactants, solubilizers, pH adjusting agents, pH buffers, oxidizing agents, enzymes, emulsifiers, non-emulsifiers, foamers, gases, bridging agents, diverting agents, dispersants, flocculants, foamers, gases, defoamers, $H_2S$ scavengers, $CO_2$ scavengers, oxygen scavengers, scale inhibitors, corrosion inhibitors, paraffin inhibitors, lubricants, viscosifiers, weighting agents, bacteria, enzymes, transition metals, water control agents (such as relative permeability modifiers), consolidating agents, proppant flowback control agents, and the like.

Those of ordinary skill in the art, with the benefit of this disclosure, will be able to determine the appropriate type and amount of such additives for a particular application.

Surfactants

For example, in some embodiments, the fluids may include surfactants as an additive, e.g., to improve the compatibility of the fluids with other fluids (like any formation fluids) that may be present in the well bore or reduce interfacial tension. Using surfactants may be advisable when liquid hydrocarbons are present in the well bore. An artisan of ordinary skill with the benefit of this disclosure will be able to identify the type of surfactant as well as the appropriate concentration of surfactant to be used. Suitable surfactants may be used in a liquid or particulate form.

For example, non-emulsifying surfactants are commercially available from Halliburton Energy Services, Inc., of Duncan, Okla., under the trade names "LOSURF-259™" nonionic non-emulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the trade name "NEA-96M™" Surfactant.

Furthermore, in some embodiments, microemulsion additives may optionally be included in the treatment fluids. Examples of suitable microemulsion additives include, but are not limited to, "Pen-88M™", surfactant, "Pen-88HT™", surfactant, "SSO-21E" surfactant, "SSO-21MW™" surfactant, GasPerm 1000™ Microemulsion Surfactant/Solvent Additive, which are all commercially available from Halliburton Energy Services, Inc., of Duncan, Okla. Other suitable microemulsion additives are MA-845 additive and MA-844 additive, commercially available from CESI Chemical of Duncan, Okla.; ShaleSurf 1000 additive, commercially available from Frac Tech Services of Aledo, Tex.; and those disclosed in U.S. Patent Publication No. 2003/0166472, which is incorporated by reference.

Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In one embodiment, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid.

Mutual Solvents

In some embodiments, for example, those that include a surfactant as described above, mutual solvents may be beneficially employed. Mutual solvents may help keep other additives in solution. Suitable mutual solvents include, but are not limited to, Halliburton's MUSOL®. A Mutual Solvent, MUSOL® E Mutual Solvent, ethyleneglycolmonobutylether, and propyleneglycolmonobutylether. Other suitable solvents may include, but are not limited to, water, methanol, isopropyl alcohol, alcohol ethers, aromatic solvents, other hydrocarbons, mineral oils, paraffins, and derivatives and combinations thereof. Other suitable solvents may also be used. If used, the mutual solvent may be included in an amount of from about 1% to 20% by volume, preferably 5% to 10%.

Fluid-Loss Control Agents

The treatment fluids also may include suitable fluid-loss control agents. Such fluid-loss control agents may be particularly useful when a treatment fluid suitable for use in the present invention is being used in a fracturing application or in a fluid used to seal a formation from invasion of fluid from the well bore. A fluid-loss agent should be compatible with the treatment fluid.

Examples include, but are not limited to, starches, silica flour, gas bubbles (energized fluid or foam), benzoic acid, soaps, resin particulates, relative permeability modifiers, degradable gel particulates, diesel dispersed in fluid, and other immiscible fluids.

Another example of a suitable fluid-loss control additive is one that comprises a particulate material that is degradable. Suitable examples of degradable materials include polysaccharides such as dextran or cellulose; chitins; chitosans; proteins; aliphatic polyesters; poly(lactides); poly(glycolides); poly(glycolide-co-lactides); poly(ε-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; or combinations thereof.

If included, a fluid-loss additive may be added to a treatment fluid in an amount necessary to give the desired fluid-loss control. In some embodiments, a fluid-loss additive may be included in an amount of about 5 to about 200 lbs/Mgal of the treatment fluid. In some embodiments, the fluid-loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1% to about 10% by volume.

Diverting Agents

In order to insure that the producing zone is contacted by the well fluid uniformly, a particulate diverting agent may be placed in the well bore or the formation to isolate the zone of interest. One suitable technique involves packing the diverting agent in perforation tunnels extending from the well bore into the subterranean zone. The diverting agent in the perforation tunnels causes the well fluid introduced therein to be uniformly distributed between all of the perforations whereby the subterranean zone is uniformly treated. The particulate solid diverting agent should be subsequently removed from the perforation tunnel to allow the maximum flow of produced hydrocarbon from the subterranean zone into the well bore. This can be accomplished by contacting the particulate solid diverting agent with a fluid that degrades the diverting agent, such as, water, acid, oil, xylene, and the like. Other chemical diverting agents that are suitable for use in this invention include oil-soluble resins, water-soluble rock salts, and emulsions.

If included, a diverting agent may be added to a treatment fluid in an amount necessary to give the desired diversion. In some embodiments, a diverting agent may be included in an amount of about 5 to about 200 lbs/Mgal of the treatment fluid. In some embodiments, the diverting agent may be included in an amount from about 10 to about 50 lbs/Mgal of the treatment fluid.

Degradable Material for Fluid-Loss Agent or Diverting Agent

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ. The terms "degradable" or "degradation" refer to both the two relatively extreme cases of degradation that the degradable material may undergo, that is, heterogeneous (or bulk erosion) and homogeneous (or surface erosion), and any stage of degradation in between these two.

The degradation can be a result of, inter alia, a chemical or thermal reaction or a reaction induced by radiation. The degradable material is preferably selected to degrade by at least one mechanism selected from the group consisting of: hydrolysis, hydration followed by dissolution, dissolution, decomposition, or sublimation. In certain embodiments, a degradable material is sufficiently acid-degradable as to be removed by such treatment.

Self-degradable particulate diverting materials are also suitable for use. The degradable particulate diverting materials of this invention can be placed in the subterranean zone or packed into perforation tunnels in the subterranean zone by introducing a carrier fluid containing the degradable particulate diverting materials into the subterranean zone.

In general, selection of a degradable material and fracturing fluid depends on a number of factors including: (1) the degradability of the material; (2) the particle size of the degradable material; (3) the pH of the well fluid, if water-based; (4) the design temperature; and (5) the loading of degradable material in the well fluid.

In choosing the appropriate degradable material, the degradation products that will result should also be considered. For example, the degradation products should not adversely affect other operations or components in the well.

Some examples of degradable polymers are disclosed in U.S. Patent Publication No. 2010/0267591, having for named inventors Bradley L. Todd and Trimidad Munoz, which is incorporated herein by reference.

Additional examples of degradable polymers include but are not limited to those described in the publication of Advances in Polymer Science, Vol. 157 entitled "Degradable Aliphatic Polyesters" edited by A.-C. Albertsson and the publication "Biopolymers" Vols. 1-10, especially Vol. 3b, Polyester II: Properties and Chemical Synthesis and Vol. 4, Polyester III: Application and Commercial Products edited by Alexander Steinbuchel, Wiley-VCM.

Non-limiting examples of degradable materials include, but are not limited to aromatic polyesters and aliphatic polyesters. Such polyesters may be linear, graft, branched, crosslinked, block, dendritic, homopolymers, random, block, and star- and hyper-branched aliphatic polyesters, etc.

Some suitable polymers include poly(hydroxy alkanoate) (PHA); poly(alpha-hydroxy) acids such as polylactic acid (PLA), polygylcolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PHBV); poly(omega-hydroxy alkanoates) such as poly(beta-propiolactone) (PPL) and poly (ε-caprolactone) (PCL); poly(alkylene dicarboxylates) such as poly(ethylene succinate) (PES), poly(butylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Derivatives of the above materials may also be suitable, in particular, derivatives that have added functional groups that may help control degradation rates.

Methods

According to the invention, methods are provided wherein the methods include the steps of: (A) introducing a well fluid comprising an electron-poor orthoester into a well; and (B) allowing or causing the electron-poor orthoester to hydrolyze to produce an acid and an alcohol in the well.

The well fluids with electron-poor orthoesters of the present invention may be used for carrying out a variety of subterranean well treatments, including, but not limited to, fracturing, gravel packing, frac-packing, fluid-loss control, diversion, and acidizing. The orthoesters can also be used as degradable materials for fluid-loss control or diverting agents, if desired.

One of ordinary skill in the art with the benefit of this disclosure will recognize the appropriate viscosity of the well fluid for a chosen application. In addition, one of ordinary skill in the art with the benefit of this disclosure will recognize the appropriate form of the fluid, for example, liquid, emulsion, or foam.

In some embodiments, the well fluids according to the invention can be prepared in any suitable tank equipped with suitable mixing means well known to those skilled in the art. The fluids may be transferred either at a controlled rate directly into the well bore or into a convenient storage tank for injection down the well bore.

The pumping rates and pressures utilized will depend upon the characteristics of the formation and whether or not fracturing of the formation is desired.

After a well fluid containing an electron-poor orthoester has been injected into a well bore, the well may be shut in and allowed to stand for a period of several hours or more depending on the type of orthoester employed and the particular application of the method.

The desired contact time for a well fluid according to the invention also depends on the particular application and purpose. For example, if very delayed acidizing is desired, then it may be desirable to pump a dilute, low concentration but a high volume to get deeper penetration. For matrix stimulation treatments, the expected contact time may be determined from the maximum pumping rate that does not cause the down hole pressure to exceed the fracturing pressure. For damage or fines removal procedures, the expected contact time may be based on laboratory tests, but usually should allow for extended contact periods as compared to conventional acid treatments.

After the step of allowing or causing the electron-poor orthoester to generate an acid, the method can additional include a step of flowing back from the treatment zone.

Preferably, after any such well treatment, a step of producing hydrocarbon from the subterranean formation is the desirable objective.

Applications

The methods according to the invention can have various applications in the field, as will be appreciated by those of ordinary skill in the art with the benefit of this disclosure. For example, the step of introducing a well fluid into a well can include introducing the well fluid into a zone of the well under at least one of the following conditions:

(i) to form a fracture the zone;
(ii) to perform a gravel pack in the zone;
(iii) to form a filtercake in the zone;
(iv) to contact a pre-existing filtercake in the zone;
(v) to contact formation damage in the zone;
(vi) to place an acid-degradable particulate in the matrix of the zone;
(vii) to contact acid-degradable particulate previously placed in the zone; or
(viii) to contact the matrix of the zone to remove carbonate.

Breaking Viscosity of a Viscous Fluid

In an application, this invention relates to compositions and methods used in reducing the viscosity of viscous fluids, especially for use in treatment of subterranean formations and oil and gas wells.

Compositions and methods for initiating, controlling, or enhancing the breaking of residue from viscosified fluids are provided. In certain embodiments, this may be accomplished in a subterranean formation.

One of the many advantages of the present invention is that delayed breaking of a viscosified fluid may be achieved without compromising the initial fluid properties, e.g., those required for proppant suspension and transport during a fracturing operation. One of the many advantages of the present invention is that the breaking of the viscosified fluids of this invention can be delayed for a desired delay period (e.g., hours, days, or even weeks). On the other hand, breaking of the viscosified fluids can occur relatively quickly and predictably. In addition, the breaking of the fluid can be adapted to occur, if desired, without relying on contact with formation fluids. Additionally, the breaker can be adapted to stay with the viscosified fluid, enabling an efficient and effective break at the desired time.

Acidizing

In an application, the present invention relates to methods of acidizing subterranean formations or well bores, and more specifically, to acidizing involving well fluids that include electron-poor orthoesters for generating acid and associated methods. These electron-poor orthoesters can hydrolyze down hole to form organic acids that are then used, for example, in an acidizing treatment to acidize a portion of a subterranean formation or any damage contained therein.

The compositions and methods may be used in fracture acidizing applications, matrix acidizing applications, scale removal applications, damage removal applications, hydrate treatment applications, and hydrate inhibition applications.

Acidizing fluids according to the invention should be much less corrosive to tubing, casing, and other down hole equipment than conventional acidizing fluids that are introduced into the well having a low pH. In addition, they should achieve deeper penetration into the subterranean formation from the well bore. This should permit corrosion considerations to not be a limiting factor in the design of these acidizing systems. In addition, the systems should present little or no acid handling concerns for personnel and equipment, such as some acid resistant equipment. Also, longer effective fracture acidizing lengths should be realized at least in most embodiments. Another benefit may be that leak off may be less as compared to conventional acidic fluids. Next, another benefit may be that little or no corrosion inhibitor will be needed. This will allow the acid treatment under conditions where corrosion inhibition cannot be achieved due to treating conditions or environmental considerations. One of the more important benefits should be that deeper penetration of the acid into the subterranean formation should be obtained. Additionally, in certain embodiments, the acidizing systems should effectively generate wormholes to stimulate production in subterranean carbonate formations, dissolve damage, and remove fines to recover production in formations at elevated temperatures.

Another benefit of the present invention is that it provides for the delayed generation of hydrofluoric acid through the reaction of an electron-poor orthoester and any other compound that generates hydrofluoric acid by reacting with the acid generated by the electron-poor orthoester. Delayed generation of the hydrofluoric acid allows for deeper placement of the hydrofluoric acid within the subterranean formation and alleviates handling and surface exposure concerns often associated with hydrofluoric acid.

Other Applications

Other purposes may also be applicable including those that involve the generation of an acid or an alcohol downhole. For example, they may be used in diversion applications.

In some embodiments, if treating a condensate bank in a formation, the preferred option may be to run a non-aqueous electron-poor orthoester (even with no solvent).

CONCLUSION

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method comprising the steps of:
   (A) introducing a well fluid comprising an electron-poor orthoester into a well, the electron-poor orthoester selected from the group of electron-poor orthoesters that hydrolyze to form an acid having a pKa less than 3.75; and
   (B) allowing or causing the electron-poor orthoester to hydrolyze to produce an acid and an alcohol in the well.

2. The method according to claim 1, wherein the electron-poor orthoester is a polyorthoester.

3. The method according to claim 1, wherein the electron-poor orthoester is selected from the group of electron-poor orthoesters that hydrolyzes to form an acid having a pKa less than 2.

4. The method according to claim 1, wherein the electron-poor orthoester is selected from the group of electron-poor orthoesters that hydrolyzes to form an acid having a pKa less than 1.

5. The method according to claim 1, wherein the electron-poor orthoester is selected from the group of orthoesters having at least one electron-withdrawing group vicinal to the orthoester group that is selected from the group consisting of chlorine, fluorine, nitrile, aromatic, ester, nitro, sulfonate, and ketone.

6. The method according to claim 1, wherein the electron-poor orthoester is selected from the group of electron-poor orthoesters having at least one alcohol group of the orthoester group that is selected from the group consisting of: alkyl alcohols having one to 20 carbon atoms; a glycerol; diols having 1 to 20 carbon atoms; sorbitol; monosaccharides; polysaccharides; polyols; and ether alcohols having 1 to 20 carbon atoms.

7. The method according to claim 1, wherein the well fluid is a water-based well fluid.

8. The method according to claim 7, wherein the continuous phase of the water-based well fluid has a pH of at least 8.

9. The method according to claim 7, wherein the well fluid is a viscous well fluid.

10. The method according to claim 7, wherein the well fluid comprises a viscosity-increasing agent.

11. The method according to claim 10, wherein the viscosity-increasing agent is a water-soluble polymer.

12. The method according to claim 11, wherein the viscosity-increasing agent is a viscoelastic surfactant.

13. The method according to claim 7, wherein the well fluid is an emulsion.

14. The method according to claim 7, wherein the well fluid comprises at least proppant, gravel, or fluid-loss control particulate.

15. The method according to claim 7, wherein the viscosity of the well fluid can be broken with an acid having a pKa less than 3.77.

16. The method according to claim 1, wherein the well fluid comprises a compound that generates hydrofluoric acid by reacting with another acid.

17. The method according to claim 1, wherein the step of introducing into the well comprises introducing the well fluid into a zone of the well under at least one of the following conditions:
   (i) to form a fracture in the zone;
   (ii) to perform a gravel pack in the zone;
   (iii) to form a filtercake in the zone;
   (iv) to contact a pre-existing filtercake in the zone;
   (v) to contact formation damage in the zone;
   (vi) to place an acid-degradable particulate in a matrix of the zone;

(vii) to contact acid-degradable particulate previously placed in the zone; or (viii) to contact the matrix of the zone to remove carbonate.

18. A water-based well fluid comprising:
(A) a continuous aqueous phase having a pH of a least 8;
(B) an electron-poor orthoester, the electron-poor orthoester selected from the group of electron-poor orthoesters that hydrolyzes to form an acid having a pKa less than 3.75; and
(C) a viscosity-increasing agent.

19. The well fluid according to claim 18, wherein the well fluid is an emulsion.

20. The well fluid according to claim 18, wherein the well fluid comprises at least proppant, gravel, or fluid-loss control particulate.

21. The well fluid according to claim 18, wherein the well fluid is viscous, and wherein the viscosity of the well fluid can be broken by reducing the pH of the fluid.

22. The well fluid according to claim 18, wherein the well fluid comprises a compound that generates hydrofluoric acid by reacting with another acid.

* * * * *